United States Patent
Hayashi

(10) Patent No.: US 9,393,696 B2
(45) Date of Patent: Jul. 19, 2016

(54) ROBOT SYSTEM AND ROBOT CONTROL METHOD

(71) Applicant: CANON KABUSHIKI KAISHA, Tokyo (JP)

(72) Inventor: Tadashi Hayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 14/296,030

(22) Filed: Jun. 4, 2014

(65) Prior Publication Data

US 2014/0371910 A1 Dec. 18, 2014

(30) Foreign Application Priority Data

Jun. 17, 2013 (JP) .................................. 2013-126680

(51) Int. Cl.
| | | |
|---|---|---|
| G05B 15/00 | (2006.01) | |
| G05B 19/00 | (2006.01) | |
| B25J 9/16 | (2006.01) | |
| B25J 19/02 | (2006.01) | |

(52) U.S. Cl.
CPC .............. *B25J 9/1697* (2013.01); *B25J 19/023* (2013.01); *Y10S 901/47* (2013.01)

(58) Field of Classification Search
CPC ...... B25J 9/1697; B25J 19/023; Y10S 901/47
USPC ................. 700/245, 250, 251, 253, 258, 259; 318/568.11, 568.12, 568.16, 568.21
See application file for complete search history.

(56) References Cited

U.S. PATENT DOCUMENTS

| | | | | |
|---|---|---|---|---|
| 4,891,767 | A * | 1/1990 | Rzasa | B25J 9/1697 382/151 |
| 6,194,860 | B1 * | 2/2001 | Seelinger | B25J 5/007 318/586 |
| 6,215,224 | B1 | 4/2001 | Kataoka et al. | |
| 6,229,402 | B1 | 5/2001 | Kataoka et al. | |
| 7,177,459 | B1 * | 2/2007 | Watanabe | B25J 9/1697 382/151 |
| 7,424,341 | B2 | 9/2008 | Watanabe et al. | |
| 8,098,928 | B2 | 1/2012 | Ban et al. | |
| 2005/0065653 | A1 * | 3/2005 | Ban | B25J 9/1697 700/245 |
| 2013/0039541 | A1 | 2/2013 | Inazumi | |
| 2014/0015992 | A1 * | 1/2014 | Taguchi | H04N 5/2256 348/222.1 |
| 2014/0184753 | A1 * | 7/2014 | Kawamoto | G03B 35/02 348/47 |

FOREIGN PATENT DOCUMENTS

| | | |
|---|---|---|
| CN | 1573628 A | 2/2005 |
| CN | 101274432 A | 10/2008 |

(Continued)

OTHER PUBLICATIONS

Chinese Office Action dated Aug. 11, 2015 for counterpart Chinese Application No. 201410259247.5.

*Primary Examiner* — Jaime Figueroa
(74) *Attorney, Agent, or Firm* — Fitzpatrick, Cella, Harper & Scinto

(57) ABSTRACT

A robot system includes a robot body, a camera mounted on the robot body and capable of photographing a work piece; and a control device for driving and controlling the robot body based on a trajectory to an instruction point, which is set in advance, and, when the camera arrives at an area in which the camera is capable of photographing the work piece during this driving and controlling, driving and controlling the robot body so that the camera moves linearly toward the work piece, taking an image of the work piece with the camera while the camera is moving linearly, and measuring a position of the work piece from the taken image.

16 Claims, 13 Drawing Sheets

(56) References Cited

FOREIGN PATENT DOCUMENTS

| CN | 101372098 A | 2/2009 |
| CN | 101733755 A | 6/2010 |
| CN | 102736626 A | 10/2012 |
| JP | 4-365586 A | 12/1992 |
| JP | 8-241109 A | 9/1996 |
| JP | 2000-288974 | 10/2000 |
| JP | 2003-326485 A | 11/2003 |

* cited by examiner

FIG. 4

| MOVEMENT DIRECTION \ BLUR DIRECTION | X | Y |
|---|---|---|
| X | $\frac{f}{w}\int_0^T v_x(t)dt$ | 0 |
| Y | 0 | $\frac{f}{w}\int_0^T v_y(t)dt$ |
| Z | $\frac{xf}{w^2}\int_0^T v_z(t)dt$ | $\frac{yf}{w^2}\int_0^T v_z(t)dt$ |

ROBOT SYSTEM AND ROBOT CONTROL METHOD

BACKGROUND OF THE INVENTION

1. Field of the Invention

The present invention relates to a robot system including a robot arm on which a camera is mounted, and a robot control method.

2. Description of the Related Art

When a robot system is used to grip a work piece, assemble a work piece, or the like, a camera mounted on the tip of a robot arm may be put into use to measure the position and posture of the work piece so that the work piece is gripped, assembled, or the like based on the measured information (see Japanese Patent Application Laid-Open No. 2000-288974).

A problem with a camera that is mounted on the distal end of a robot arm is that an image of a part or the like that is taken with the camera while the robot arm is moving is blurred, which hinders the obtainment of accurate positional information and the like of the part. The robot arm therefore needs to be halted while a part or the like is photographed in order to obtain accurate positional information and the like. However, robot arms in general have a large inertia, and halting a robot arm to photograph a part or the like means that considerable time is spent on the work cycle of slowing down the robot arm, bringing the robot arm to a halt, photographing, and reaccelerating the robot arm. The resultant problem is a decrease in operating speed.

It is therefore an object of the present invention to provide a robot system that can execute various works with the use of an image taken by a camera without impairing the operating speed.

SUMMARY OF THE INVENTION

According to one embodiment of the present invention, there is provided a robot system, including: a robot body; a camera mounted on the robot body and capable of photographing a work piece; and a control device for driving and controlling the robot body based on a trajectory to an instruction point, which is set in advance, and, when the camera arrives at an area in which the camera is capable of photographing the work piece during this driving and controlling, driving and controlling the robot body so that the camera moves linearly toward the work piece, taking an image of the work piece with the camera while the camera is moving linearly, and measuring a position of the work piece from the taken image.

Further, according to one embodiment of the present invention, there is provided a robot system, including: a robot body; a stereo camera mounted on the robot body and capable of photographing a work piece; and a control device for driving and controlling the robot body based on a trajectory to an instruction point, which is set in advance, and, when the stereo camera arrives at an area in which the stereo camera is capable of photographing the work piece during this driving and controlling, driving and controlling the robot body so that the stereo camera moves linearly toward the work piece, taking an image of the work piece with the stereo camera while the stereo camera is moving linearly, and measuring a three-dimensional position of the work piece from the taken image.

Further, according to one embodiment of the present invention, there is provided a robot control method, including: a linear movement control step of driving and controlling, by a control unit, a robot body based on a trajectory to an instruction point, which is set in advance, and, when a camera mounted on the robot body arrives at an area in which the camera is capable of photographing a work piece during this driving and controlling, driving and controlling the robot body so that the camera moves linearly toward the work piece; a work piece position measuring step of taking, by the control unit, an image of the work piece with the camera while the camera is moving linearly, and measuring a position of the work piece from the taken image.

Further, according to one embodiment of the present invention, there is provided a robot control method, including: a linear movement control step of driving and controlling, by a control unit, a robot body based on a trajectory to an instruction point, which is set in advance, and, when a stereo camera mounted on the robot body arrives at an area in which the stereo camera is capable of photographing a work piece during this driving and controlling, driving and controlling the robot body so that the stereo camera moves linearly toward the work piece; and a three-dimensional position measuring step of taking, by the control unit, an image of the work piece with the stereo camera while the stereo camera is moving linearly, and measuring a three-dimensional position of the work piece from the taken image.

Further features of the present invention will become apparent from the following description of exemplary embodiments with reference to the attached drawings.

BRIEF DESCRIPTION OF THE DRAWINGS

FIG. 4 is a diagram showing a movement direction and a blur direction.

DESCRIPTION OF THE EMBODIMENTS

Preferred embodiments of the present invention will now be described in detail in accordance with the accompanying drawings.

First Embodiment

A robot system 1 according to a first embodiment of the present invention is described below with reference to FIG. 1 to FIG. 4. The schematic overall configuration of the robot system 1 according to the first embodiment is described first with reference to FIG. 1 and FIG. 2.

Figure 1:
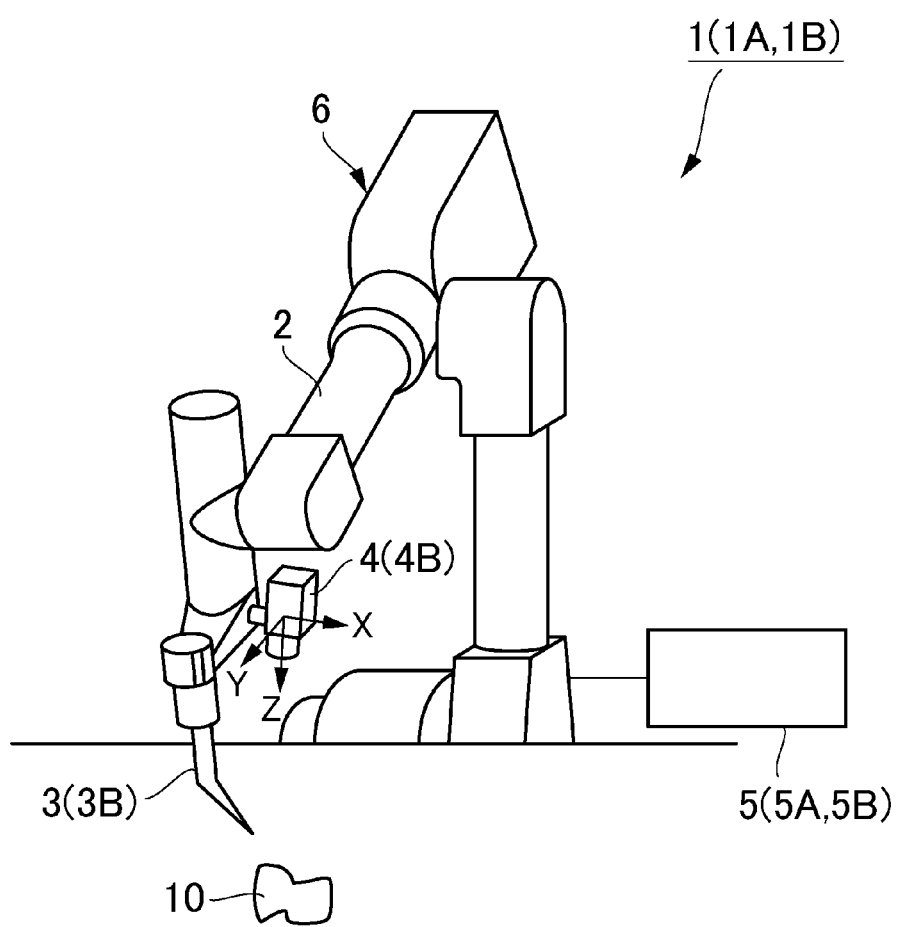
FIG. 1 is a perspective view schematically illustrating the overall structure of a robot system according to a first embodiment of the present invention.

As illustrated in FIG. 1, the robot system 1 includes a robot body 6, a camera 4, which is mounted on the robot body 6, and a control device 5, which is capable of controlling the robot body 6 and the camera 4. The robot body 6 includes a six-joint articulated robot arm 2 and an end effector 3, which is mounted on the distal end of the robot arm 2.

The robot arm 2 has a degree of freedom necessary to change the positions and postures of the end effector 3 and the camera 4. Specifically, the robot arm 2 includes six actuators which drive the respective joints so that the joints rotate about their respective joint axes, and moves the end effector 3 and the camera 4 to an arbitrary three-dimensional point by driving the actuators separately and selectively. The end effector 3 is used to perform work such as gripping or assembling a work piece (object) 10. The end effector in this embodiment is a dispenser mounted on the distal end of the robot arm 2 to apply a coat, an adhesive, or the like to a given point on the work piece 10.

The robot arm 2 and the end effector 3 are not limited to the configuration described above. For example, the robot arm can be a horizontal multi-articulated type or an XYZ-axis type, or a configuration in which a necessary degree of freedom is secured by adding joint axes thereto. The end effector may be a driver, a gripper, or an electric discharge machine. In the case where the robot arm 2 does not need to perform work such as gripping (for example, in the case of letter recognition, surface state observation, or the like), a camera may be mounted as the end effector to the distal end of the robot arm 2.

The camera 4 is used to assist with the work performed by the end effector 3, and photographs the work piece 10 in order to obtain information such as the accurate position and posture of the work piece 10. The camera 4 is mounted on the distal end of the robot arm 2 in the vicinity of the end effector 3, and changes its position and posture unitarily with the end effector 3 following the operation of the robot arm 2. The vicinity here can be any point that is on the same link as the robot body 6 (the robot arm 2 and the end effector 3) and that allows the camera 4 to move in synchronization with the end effector 3. The camera 4 may also be mounted on the end effector 3.

Figure 2:
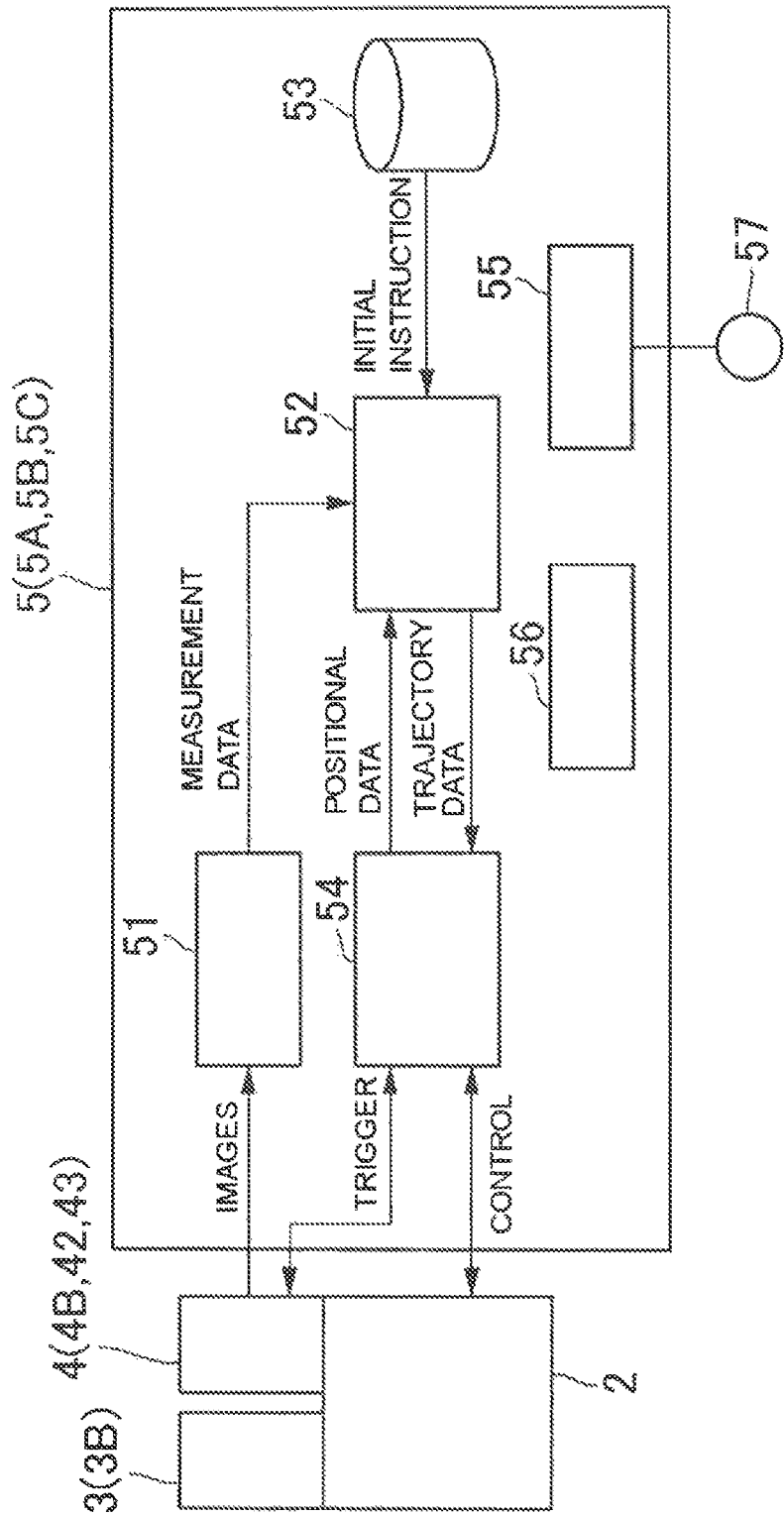
FIG. 2 is a block diagram of a control device according to the first embodiment of the present invention.

As illustrated in FIG. 2, the control device (control unit) 5 includes an image processing device 51, a trajectory generating device 52, a storage device 53, a robot controller 54, a recording medium reading device 55, and a communication device 56.

The image processing device 51 measures the relative position of the work piece 10 in relation to the camera 4 at the time of photographing, based on an image taken with the camera 4. The measurement can use pattern matching, a method that obtains a feature point such as a barycenter or an intersection by extracting edges, and other measurement methods, and is not limited to a particular method in this embodiment. In the case where the camera is mounted instead of the end effector to the tip of the robot arm, the image processing device 51 observes the state of the work piece such as checking whether there is a work piece or not, observing the surface state of the work piece, and recognizing letters on a label of the work piece.

The trajectory generating device 52 is a device for generating a trajectory of the robot arm 2 that leads the end effector 3 to a target point in order to execute a given work on the work piece 10. Specifically, the trajectory generating device 52 generates a trajectory of the robot arm 2 to a temporary target point (hereinafter referred to as "approach trajectory") based on an instruction point which is instructed in advance. When the robot arm 2 reaches an area in the vicinity of the work piece 10 where the camera 4 can photograph the work piece 10, the trajectory generating device 52 generates a trajectory of the robot arm 2 so that the camera 4 moves linearly in parallel with the optical axis of the camera 4 (hereinafter referred to as "parallel trajectory"). The trajectory generating device 52 further modifies the approach trajectory based on a measured target point in the case where a measurement of the target point reveals that the temporary target point and the measured target point do not coincide with each other.

The instruction point is instructed via a known teaching pendant (not shown), or an input device of a personal computer (not shown) or the like. An instruction point usually contains an error, which causes a deviation from the true target point. When this is the case, the instruction point is set as a temporary target point and, if the moving direction of the camera 4 deviates from a direction parallel to the optical axis of the camera 4, the parallel trajectory or the like can be modified as needed based on information from the image processing device 51.

The storage device 53 stores various programs for generating the approach trajectory and the parallel trajectory, the result of processing positional information of the work piece 10 measured by the image processing device 51, and data such as an initial instruction point which is instructed by a user in advance. The storage device 53 can be substituted or omitted by displaying storage on a user interface.

The robot controller 54 drives and controls the robot arm 2 so that the end effector 3 and the camera 4 move on the approach trajectory and the parallel trajectory which are generated by the trajectory generating device 52. In controlling the robot arm 2, the robot controller 54 uses feedback control to obtain the current position information of the robot arm 2. The robot controller 54 also controls the photographing of the camera 4 when the robot arm 2 is being driven based on the parallel trajectory which is generated by the trajectory generating device 52, and drives and controls the end effector 3 that has arrived at a target point. The robot controller 54 in this embodiment issues a photographing instruction to the camera 4 once the camera 4 gets on the parallel trajectory in which the moving direction of the camera 4 is a linear direction parallel to the optical axis of the camera 4 (the camera 4 moves along its optical axis). The photographing instruction can be issued any time after the camera 4 gets on the parallel trajectory, and may be issued multiple times so that the work piece is photographed multiple times.

The recording medium reading device 55 is used to, among others, read a computer-readable recording medium 57 on which various programs including a robot control program are recorded, and to store the program and data recorded on the recording medium 57 in the storage device 53. The communication device 56 is used when, for example, an update program or the like that is distributed via the Internet is downloaded via the communication device 56 without using the recording medium 57 or a similar medium.

The image processing device 51, the trajectory generating device 52, and the robot controller 54 can be implemented by a microcomputer, gate logic, an analog arithmetic device, or the like, and are not limited to a particular configuration as long as the functions described above are fulfilled. In terms of hardware, those components can be implemented by a single computer.

A method of controlling the robot arm 2 by the thus configured control device 5 is described next with reference to FIG. 3.

First, the trajectory generating device 52 generates the approach trajectory which leads the end effector 3 to a temporary target point based on an instruction point input by the user in advance, or an initial instruction point stored in the storage device 53. The approach trajectory generated in this embodiment is based on an initial instruction point TP stored in the storage device 53. The approach trajectory may also be generated based on an instruction point that is input by the user through an input device (not shown).

Once the approach trajectory is generated, the robot controller 54 drives and controls the robot arm 2 so that the end effector 3 and the camera 4 move along the generated approach trajectory. The driving/controlling of the robot arm 2 uses feedback control, and the robot controller 54 drives the robot arm 2 under its control toward the initial instruction point TP while obtaining the current position information of the robot arm 2.

Figure 3:
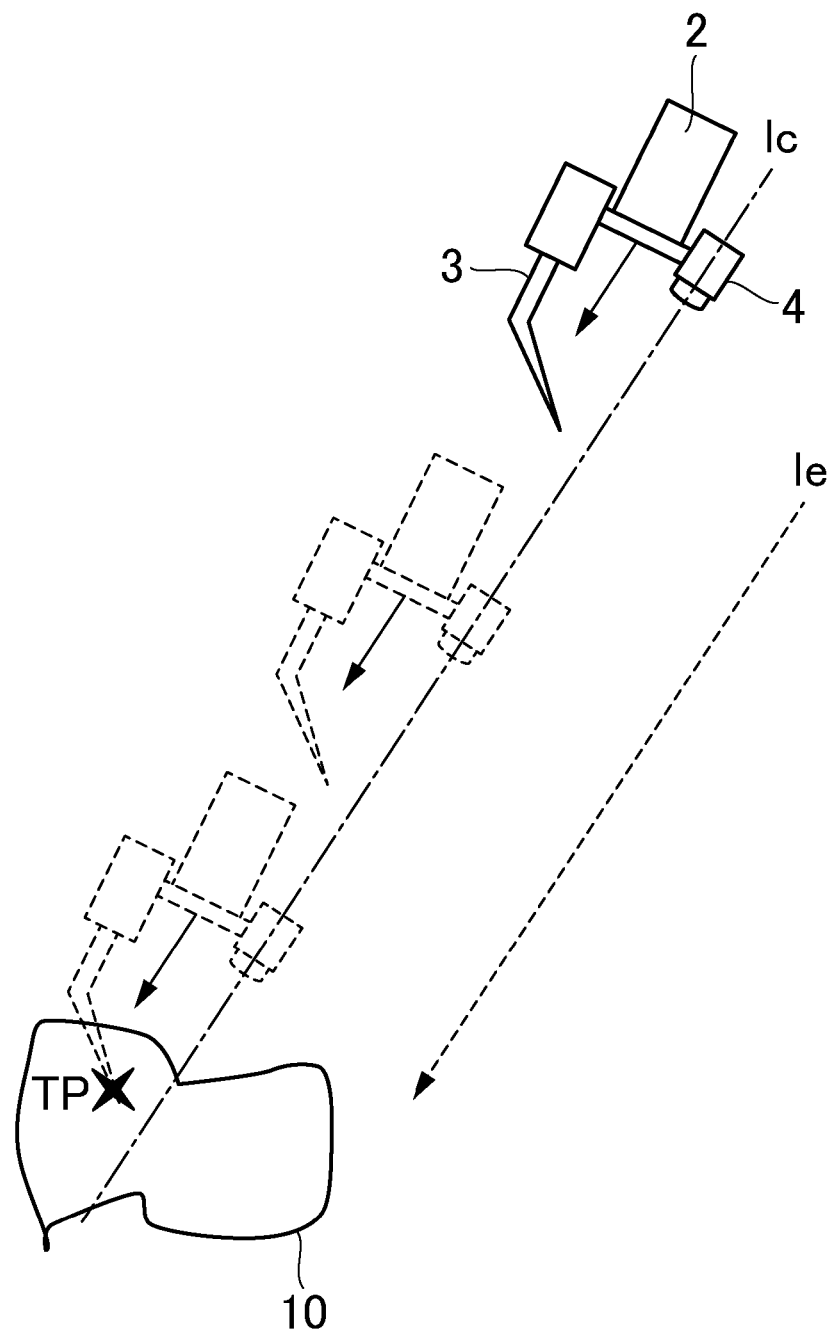
FIG. 3 is a diagram illustrating parallel trajectories of an end effector and a camera according to the first embodiment of the present invention.

When the camera 4 arrives at a range where the work piece 10 can be photographed, the trajectory generating device 52 generates the parallel trajectory so that the camera 4 moves linearly toward the work piece 10 in parallel to the camera's optical axis (straight line lc illustrated in FIG. 3). Once the parallel trajectory is generated, the robot controller 54 drives and controls the robot arm 2 so that the end effector 3 and the camera 4 move along the generated parallel trajectory (linear movement control step). The trajectory of the end effector that is observed when the camera 4 moves along the straight line lc is represented by a straight line le, which is parallel to the straight line lc.

Next, when the camera 4 gets on the parallel trajectory, the robot controller 54 transmits a trigger signal to the camera 4. Receiving the trigger signal, the camera 4 photographs an area around the initial instruction point TP while moving toward the work piece 10 in parallel to the optical axis. The image taken with the camera 4 is transferred to the image processing device 51 via a transmission cable (not shown) or a wireless device (not shown). Finishing photographing, the camera 4 transmits to the robot controller 54 a trigger signal that indicates the completion of exposure (photographing).

Receiving the trigger signal from the camera 4, the robot controller 54 records positional data of the robot arm 2 at that time, and transfers the data to the trajectory generating device 52. The transmission of the trigger signal from the camera 4 can be omitted in the case where the length of the camera's exposure time is known in advance. For example, a timer included in the robot controller 54 is used to record the positional data of the robot arm 2 at the time the exposure is finished.

The image processing device 51 receives the photographed image and, based on the received image, measures the relative target point in relation to the camera 4 at the time the image is taken. The image processing device 51 transfers the measurement data to the trajectory generating device 52. The trajectory generating device 52 receives the positional data of the robot arm 2 transferred from the robot controller 54 and the measurement data transferred from the image processing device 51, and calculates the target point in a robot coordinate system (work piece position measuring step). The positional data and the measurement data are data of the same time point, and the position of the camera 4 in the robot coordinate system is determined from the positional data of the robot arm 2. The target point in the robot coordinate system can therefore be calculated by adding the camera position in the robot coordinate system to the measurement data from the image processing device 51.

After calculating the target point, the trajectory generating device 52 uses the data obtained by the calculation to modify the approach trajectory with respect to the initial instruction point TP, which has been loaded from the storage device 53, and thus calculates a new trajectory to the target point (trajectory modifying step). The trajectory calculation can use various methods including commonly-used trajectory calculating methods, and is not limited to a particular calculation method. Examples of methods that can be used include a method that minimizes the distance between the end effector 3 and the target point, a method that minimizes the drive amount of the joints in the robot arm 2, and a method that combines algorithms each of which avoids a singular point.

The image processing and trajectory calculation usually take time, and the robot arm 2 maintains the approach trajectory during that time. The operation of modifying the approach trajectory is not limited to once but may be repeated as many times as possible.

The new approach trajectory obtained by calculation is transferred as trajectory data to the robot controller 54. The robot controller 54 drives and controls the robot arm 2 so that the end effector 3 and the camera 4 move along the newly generated approach trajectory. Those pieces of information are transferred to the storage device 53 to be accumulated as measurement information of the work piece 10.

Described next with reference to FIG. 4 is an effect that is obtained when the camera 4 is moved along the parallel trajectory generated in the manner described above. First, the end effector needs to be led to an accurate target point in order to perform some work on a work piece with the end effector. There is usually an error between the position of the work piece at the time the instruction is given and the position of the work piece at the time actual work is performed, which makes it necessary to modify the target point based on information of an image taken with the camera. The following is a concrete description on the effect of moving the camera 4 along the parallel trajectory.

First, a camera coordinate system is set on an imaging plane of the camera 4 by setting an X-axis and a Y-axis, which intersect with the camera's optical axis at the origin, and a Z-axis, which runs in a direction orthogonal to the imaging plane (optical axis direction) (see FIG. 1). Camera velocities in the X-axis direction, the Y-axis direction, and the Z-axis direction at a photographed time t are given as $Vx(t)$, $Vy(t)$, and $Vz(t)$, respectively. The distance between the camera 4 and the work piece 10 is given as W, the focal distance of the camera 4 is given as f, the position of a measurement point on the imaging plane is given as $(x, y)$, and the exposure time is given as T. Then, the amounts of blurring caused by the movement of the camera 4 (movement direction) with respect to the X-axis direction, the Y-axis direction, and the Z-axis direction are as shown in FIG. 4.

Blurring in the X-axis direction with respect to the movement in the Z-axis direction is described below. Blurring in the Y-axis direction is expressed by the same expression as that of blurring in the X-axis direction, except that x is substituted with y, and a description thereof is therefore omitted. The amount of blurring with respect to the movement in the Z-axis direction is originally expressed as follows.

$$\frac{x \cdot f}{W^2 - W \int_0^T v_z(t)\,dt} \int_0^T v_x(t)\,dt$$

However, because the end effector 3 may bump into the work piece 10, the robot arm 2 needs to be set so that the following expression is satisfied during photographing.

$$W \gg \int_0^T v_z(t)\,dt$$

Accordingly, the amount of blurring with respect to the movement in the Z-axis direction is expressed approximately by an expression shown in FIG. 4.

$$\frac{x \cdot f}{W^2} \int_0^T v_x(t)\,dt$$

If the camera mounted on the robot body 6 is large in size, the payload becomes heavier and there is a chance of interference with other structures. The camera is therefore designed to be small in size. In other words, the sensor size of the camera in relation to the photographing distance is designed to be small enough to satisfy $x \ll W$. The following expression is therefore established.

$$\frac{x \cdot f}{W^2} \ll \frac{f}{W}$$

When the movement speed is the same, the amount of blurring is therefore small only with respect to the Z-axis direction.

For example, when the focal distance f of the camera is 20 mm, the photographing distance W is 100 mm, the movement speeds in the X-axis, Y-axis, and Z-axis directions Vx(t), Vy(t), and Vz(t) are all 50 mm/s, the exposure time T is 10 msec, the sensor pitch is 2 μm, and the measurement point x on the imaging plane is 1 mm, blurring with respect to the movement in the X-axis direction is 0.1 mm, i.e., 50 pixels, at a point that is 1 mm from the center on the imaging plane. The consequence of this blurring cannot be ignored. Blurring with respect to the movement in the Z-axis direction, on the other hand, is merely 1 μm, i.e., 0.5 pixels, and has no significant consequence.

As has been described, in the robot system 1 according to the first embodiment, when the robot arm 2 under control is driven on the approach trajectory, which is generated based on an instruction point, and the camera 4 approaches the work piece 10, the robot arm 2 is driven and controlled so that the camera 4 moves linearly toward the work piece 10. Specifically, the robot arm 2 is driven and controlled so that the camera 4 moves in parallel to its optical axis. The camera 4 photographs the work piece 10 while moving linearly in parallel to the optical axis. Blurring caused by the movement of the camera 4 which is mounted on the robot arm 2 is therefore reduced despite the robot arm 2 being driven. The accuracy is thus improved in the measurement of the position/posture of a work piece, the measurement of the surface state such as whether there is a part or not, the recognition of a label, and the like.

In addition, because the camera takes an image without stopping the robot arm 2, the time for reacceleration of the robot arm 2 is unnecessary and the work time is shortened.

The term "parallel" as used herein includes "substantially parallel" which is not strictly parallel in mathematical sense but provides an equal effect. It is acceptable if a deviation from the strict parallel direction is small and the movement components in the X-axis direction and the Y-axis direction are ignorable compared to the movement in the Z-axis direction. For instance, in the example given above, a substantially equal effect is obtained when the deviation in parallelism is such that the camera travels 1 μm in the X-axis direction and the Y-axis direction while traveling 100 μm in the Z-axis direction.

Second Embodiment

A second embodiment of the present invention is described next with reference to FIG. 5 in addition to FIG. 1 and FIG. 2. A robot system 1A according to the second embodiment differs from the first embodiment in the trajectories of the end effector 3 and the camera 4 which are controlled by a control device 5A. The description of the second embodiment is therefore centered on the difference from the first embodiment, namely, the trajectories of the end effector 3 and the camera 4, and a description on the configuration that is the same as the one in the first embodiment is omitted.

As illustrated in FIG. 1 and FIG. 2, the robot system 1A includes the robot body 6, the camera 4, and the control device 5A, which is capable of controlling the robot body 6 and the camera 4. The robot body 6 includes the robot arm 2 and the end effector 3. The control device 5A includes the image processing device 51, the trajectory generating device 52, the storage device 53, the robot controller 54, the recording medium reading device 55, and the communication device 56.

A method of controlling the robot arm 2 by the thus configured control device 5A is described next with reference to FIG. 5. Steps up to the arrival at a range where the camera 4 can photograph the work piece 10 are the same as in the first embodiment, and a description thereof is omitted here.

When the camera 4 arrives at the area where the work piece 10 can be photographed, the trajectory generating device 52 generates the parallel trajectory so that the camera 4 moves linearly (the straight line 1c of FIG. 3) toward the work piece 10 in parallel to the camera's optical axis. The trajectory generating device 52 at this point forms the parallel trajectory so that the initial instruction point TP is located on the optical axis of the camera 4 at least until a point where the camera 4 takes an image as illustrated in FIG. 5.

With the initial instruction point TP on the optical axis of the camera 4, the position of an image that is taken with the camera 4 at the initial instruction point TP is expressed as x=y=0. Blurring of the image with respect to the movement in the Z-axis direction is therefore calculated as 0 by the expression of FIG. 4. Because a measurement target point is usually located near a temporary measurement point, namely, the initial instruction point, the measurement object is less blurred in the second embodiment than in the first embodiment, and a high blurring prevention effect can be obtained.

Figure 5:
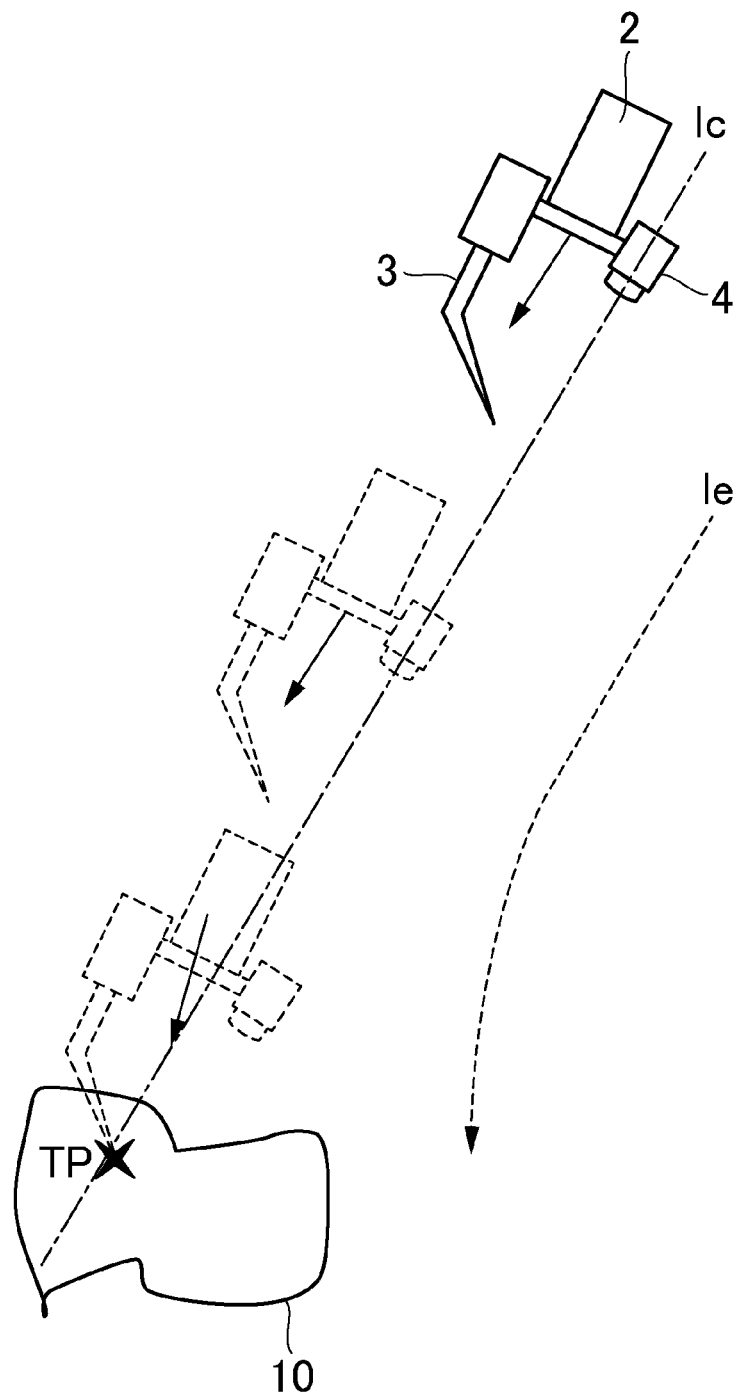
FIG. 5 is a diagram illustrating parallel trajectories of an end effector and a camera according to a second embodiment of the present invention.

The approach trajectory that is preferred after the photographing is represented by a curved part of 1e illustrated in FIG. 5. In other words, it is preferred to generate a trajectory that is curved for a smooth change after the linear movement ends with the completion of the photographing.

Third Embodiment

Figure 6:
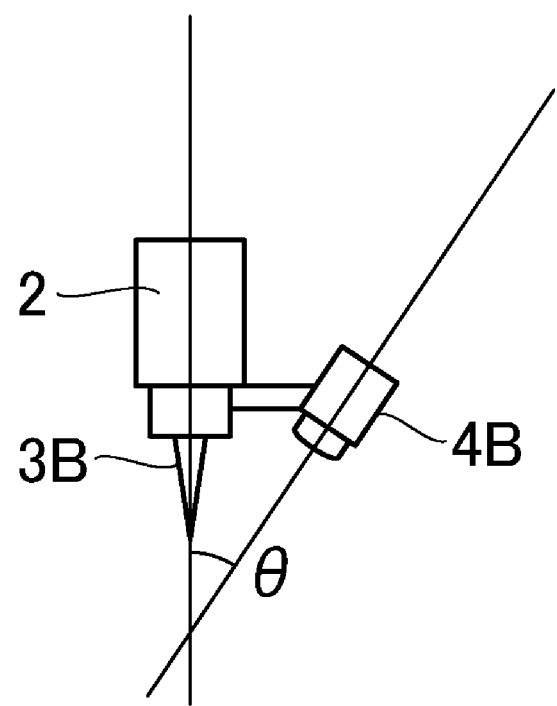
FIG. 6 is a diagram illustrating an end effector and a camera according to a third embodiment of the present invention.

A third embodiment of the present invention is described next with reference to FIG. 6 and FIG. 7 in addition to FIG. 1 and FIG. 2. A robot system 1B according to the third embodiment differs from the first embodiment in that a camera 4B is mounted at a given angle with respect to an end effector 3B in order to include the tip of the end effector 3B in a photographed image. The description of the third embodiment is therefore centered on the difference from the first embodiment, namely, the manner in which the camera 4B is mounted, and a description on the configuration that is the same as the one in the first embodiment is omitted.

As illustrated in FIG. 1 and FIG. 2, the robot system 1B includes the robot body 6, the camera 4B, and a control device 5B, which is capable of controlling the robot body 6 and the camera 4B. The robot body 6 includes the robot arm 2 and the end effector 3B. The control device 5B includes the image processing device 51, the trajectory generating device 52, the storage device 53, the robot controller 54, the recording medium reading device 55, and the communication device 56.

Most end effectors such as drivers and dispensers are limited in work posture in general. In other words, a work with an end effector has directivity and the end effector needs to be in a particular posture during work. The camera 4B in this embodiment is therefore fixed to the tip of the robot arm 2 so that an appropriate elevation angle of the camera 4B with respect to the end effector 3B always keeps the tip of the end effector 3B included in the angle of view of the camera 4B as illustrated in FIG. 6 and FIG. 7.

The elevation angle as used herein is an angle θ formed between the optical axis of the camera 4B and a work direction of the end effector (for example, driver) 3B. In other words, the elevation angle is an angle at which the camera 4B looks into a work site from the side with respect to the work direction so that the work site is included in a photographed image while the end effector 3B is working. The work direction of the end effector 3B is, in the case of a driver, for example, a direction in which a screw is moved, namely, the primary axis direction. Usually, the camera 4B is installed so that setting an appropriate elevation angle puts a work point of the end effector 3B near the optical axis.

Figure 7:
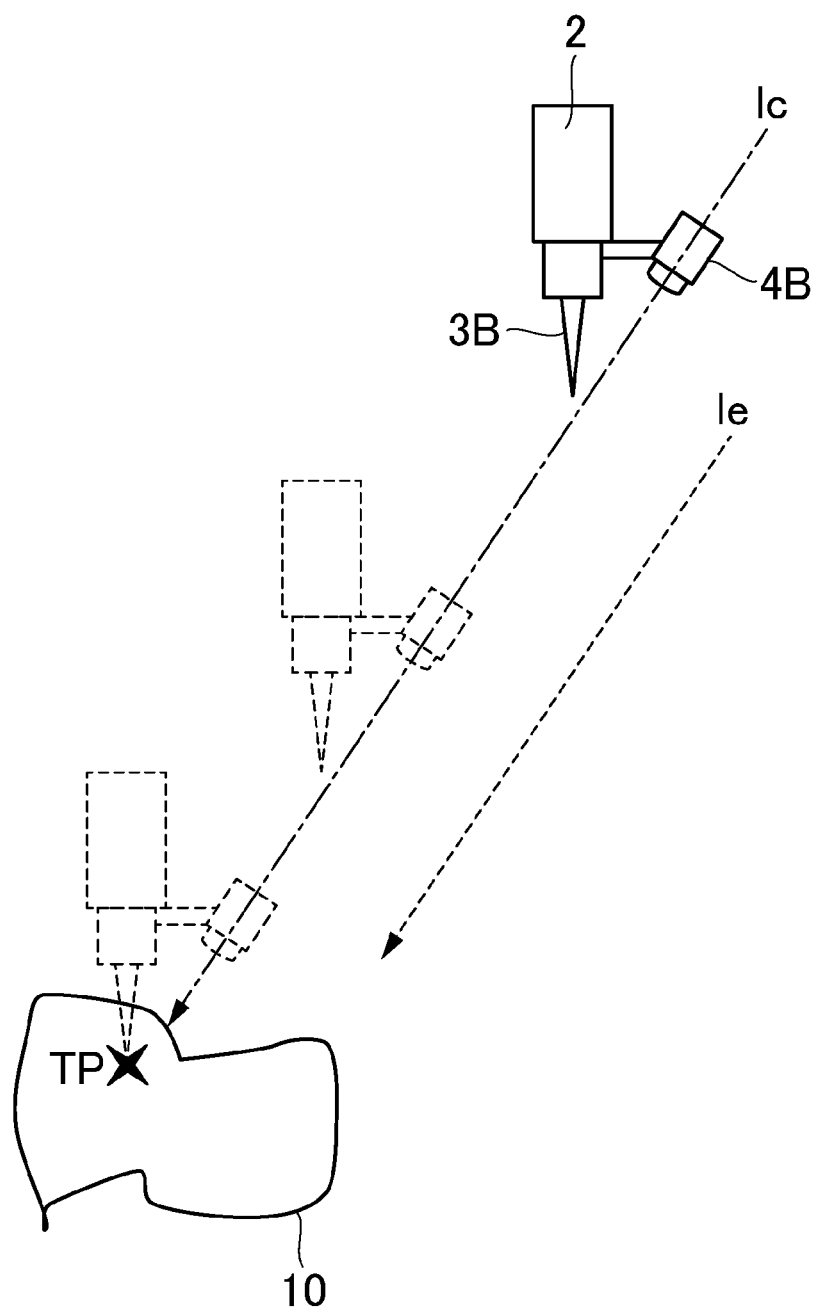
FIG. 7 is a diagram illustrating parallel trajectories of the end effector and the camera according to the third embodiment of the present invention.
Figure 12:
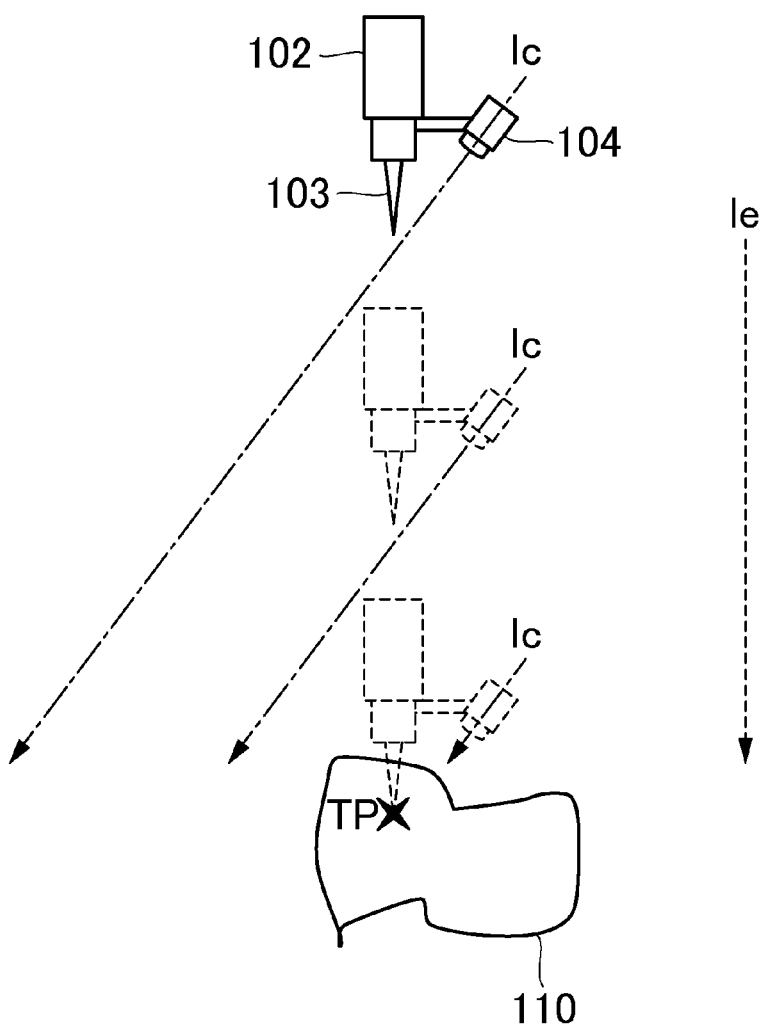
FIG. 12 is a diagram illustrating trajectories of an end effector and a camera in the related art.
Figure 13:
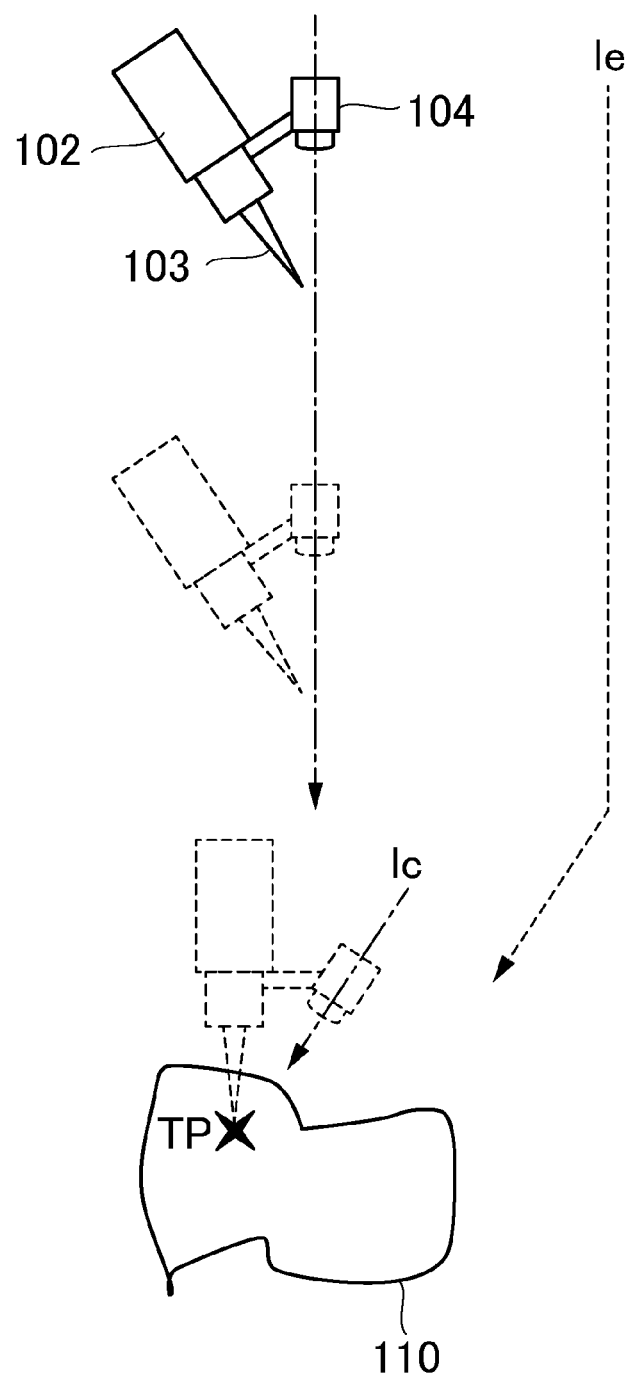
FIG. 13 is another diagram illustrating trajectories of the end effector and the camera in the related art.

With the camera 4B mounted so that the tip of the end effector 3B is included in a photographed image, the end effector 3B approaching a work object can be kept in a working posture as illustrated in FIG. 7, and a wasteful action is eliminated. For example, in the case of approaching a work piece 110 over the shortest distance as in an example of existing technologies that is illustrated in FIG. 12, the initial instruction point TP is not included in the angle of view at a long distance. Even after the initial instruction point TP is included in the angle of view, the position of the initial instruction point TP on the image has moved far, which results in significant blurring. In the third embodiment, in contrast, the camera 4B is on a trajectory that allows the tip of the end effector 3B to enter from the direction of the elevation angle at which the camera 4B is set while the posture of the end effector 3B is maintained. In this manner, the camera 4B moves in parallel to the direction of its optical axis and, as in the first embodiment, blurring is kept small in any photographing performed after the camera 4B gets on the parallel trajectory. In addition, the third embodiment is free from the need to move the end effector 103 greatly when the work piece is not deviated, which is the case in an example of existing technologies of FIG. 13.

Blurring in the image at an instruction point can be eliminated by employing a trajectory that puts the instruction point on the optical axis. Further, if the end effector is fixed to the tip of the robot arm so that the point of action of the end effector is also on the optical axis, the robot system 1B can be used for image servo operation that makes the point of action of the end effector coincide with the true target point which is located near the instruction point.

Fourth Embodiment

A fourth embodiment of the present invention is described next with reference to FIG. 8 to FIG. 11 in addition to FIG. 2. A robot system 1C according to the fourth embodiment differs from the first embodiment in that a stereo camera having twin lenses is used. The description on the fourth embodiment is therefore centered on the case where the stereo camera is used, and a description on the configuration that is the same as the one in the first embodiment is omitted.

Figure 8:
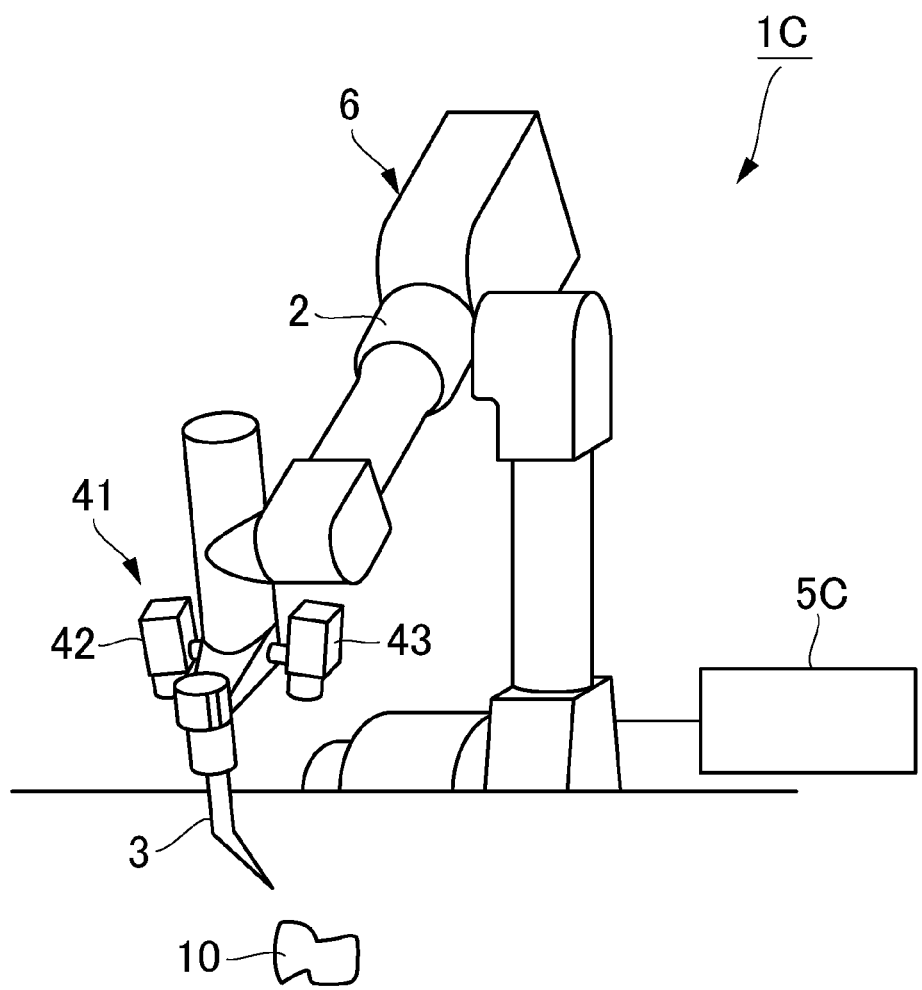
FIG. 8 is a perspective view schematically illustrating the overall structure of a robot system according to a fourth embodiment of the present invention.

As illustrated in FIG. 8, the robot system 1C includes the robot body 6, cameras 42 and 43, which are mounted on the robot body 6, and a control device 5C, which is capable of controlling the robot body 6 and the cameras 42 and 43. The robot body 6 includes the robot arm 2 and the end effector 3.

Figure 9:
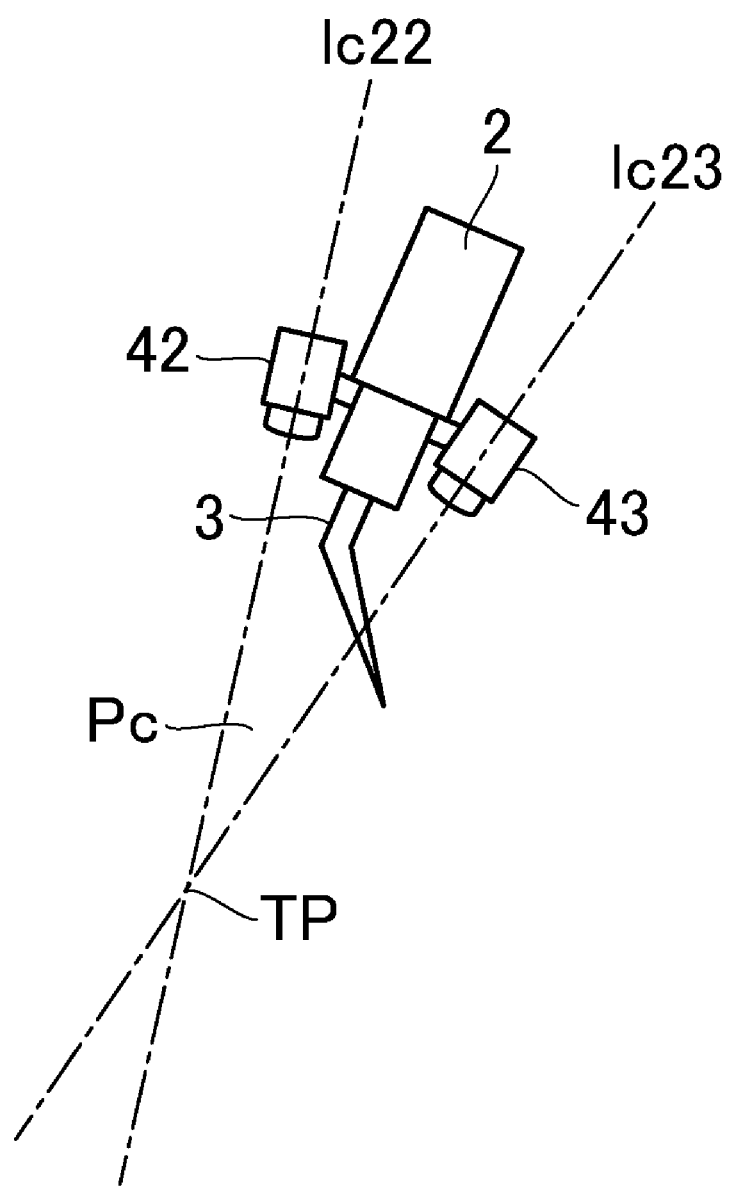
FIG. 9 is a diagram illustrating an end effector and a stereo camera according to the fourth embodiment of the present invention.

As illustrated in FIG. 9, the cameras 42 and 43 are each fixed to the robot arm 2 while maintaining a given base line length, and construct a stereo camera 41 which is capable of detecting the three-dimensional position and posture of the work piece 10 through known stereo measurement. A line lc22 of FIG. 9 is a straight line that runs through a focal point of the camera 42 and the initial instruction point TP. A line lc23 of FIG. 9 is a straight line that runs through a focal point of the camera 43 and the initial instruction point TP. A plane Pc of FIG. 9 is a plane formed by the two straight lines lc22 and lc23, in other words, a plane formed of the focal point of the camera 42, the focal point of the camera 43, and the initial instruction point TP. This plane is usually called an epipolar plane Pc, and a trajectory of the tip of the robot arm 2 is generated by the trajectory generating device 52 so as to be parallel to the epipolar plane Pc.

Figure 10:
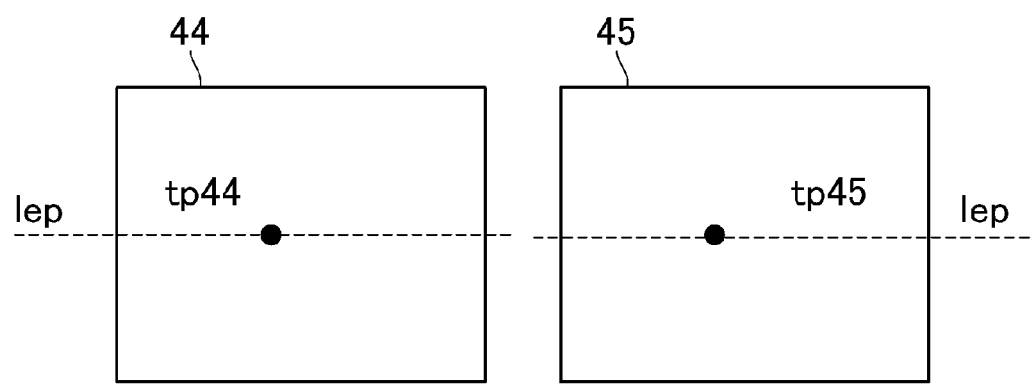
FIG. 10 is a diagram illustrating an image taken with the stereo camera.

An effect that is obtained when the cameras 42 and 43 are moved in parallel to the epipolar plane Pc is described next with reference to FIG. 10. An image 44 of FIG. 10 is an image taken with the camera 42. An image 45 of FIG. 10 is an image taken with the camera 43. A point tp44 of FIG. 10 represents a point and blurring on the image 44 at an instruction point. A point tp45 of FIG. 10 represents a point and blurring on the image 45 at the instruction point. The robot arm in this embodiment is controlled so that an image at a measurement point is always on the same epipolar plane. Accordingly, blurring occurs only in a particular direction, i.e., only on an epipolar line as illustrated in FIG. 10.

Figure 11:
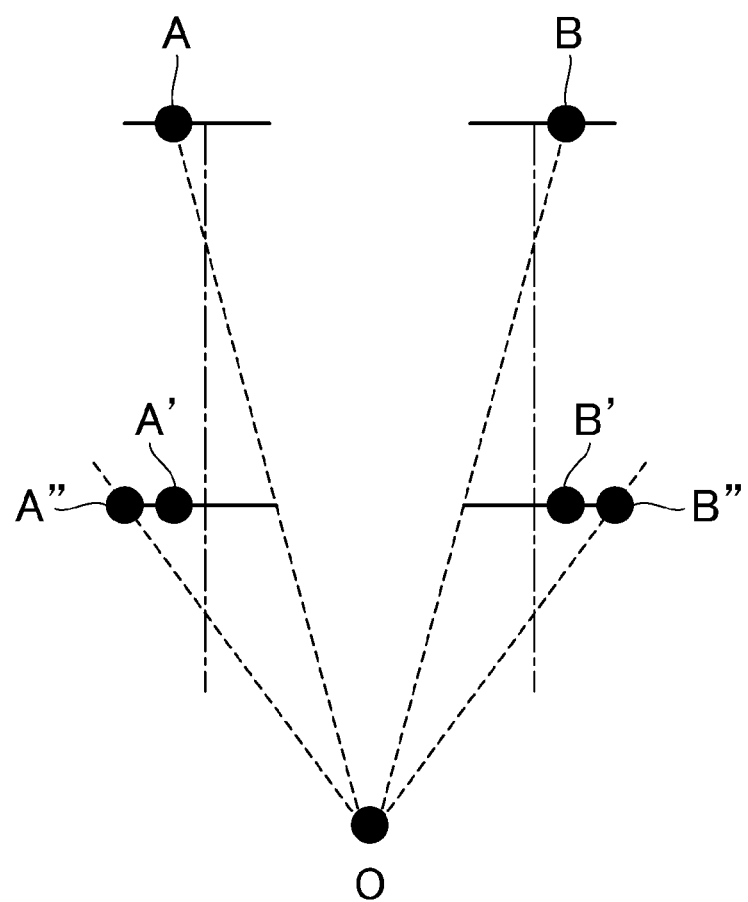
FIG. 11 is a diagram illustrating a mode in which blurring occurs in stereo measurement.

The tip of the robot arm 2 and the cameras 42 and 43 approach an instruction point during work. Therefore, according to the known principle of stereo measurement, a point on a bright line caused by blurring, where parallax is maximum, represents the final position. For example, in FIG. 11, a point O represents a measurement point, points A and B respectively represent images of the measurement point O at the time the cameras 42 and 43 start exposure, and points A" and B" respectively represent images of the measurement point O at the time the cameras 42 and 43 finish exposure. A segment A'A" and a segment B'B" represent blurring in the images of the measurement point at the time of completion of the exposure. FIG. 11 shows that the parallax is maximum when the cameras are closest to the measurement point O, in other words, in the pair of A" and B". The latest position is thus indicated by a point in a blurred image where the parallax is maximum, and this point can easily be narrowed down. In addition, measurement that uses this point yields the latest information.

As has been described, according to the fourth embodiment, a three-dimensional target point can be detected easily and accurately despite blurring, and three-dimensional position measurement by a moving camera is accomplished.

An even more preferred trajectory direction is, in addition to being parallel to the epipolar plane, parallel to a perpendicular bisector of a line that connects the focal points of the two cameras. In this way, unbalanced blurring in which only an image taken with one of the cameras is significantly blurred can be avoided. If the trajectory is generated in another trajectory direction so that the instruction point is located on the optical axis of one of the cameras in addition to having the properties described above, blurring can substantially be eliminated from an image taken with the camera. In this case, the surface state such as texture can be observed without blurring with the camera that is set so that the instruction point is located on the optical axis in addition to performing three-dimensional position measurement.

According to one embodiment of the present invention, various works can be executed by using an image taken with a camera, without impairing the operating speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-126680, filed Jun. 17, 2013, which is hereby incorporated by reference herein in its entirety.

What is claimed is:

1. A robot system, comprising:
a robot body;
a camera mounted on the robot body configured to take an image of an object; and
a control device for driving the robot body based on a trajectory to an instruction point, which is set in advance, and, when driving the robot body so that the camera moves linearly toward the object in parallel with an optical axis of the camera, taking an image of the object with the camera while the camera is moving linearly, and measuring a position of the object from the taken image.

2. The robot system according to claim 1, wherein, when the camera arrives at the area in which the camera is configured to take an image of the object, the control device drives the robot body so that the instruction point is located on an optical axis of the camera.

3. The robot system according to claim 1,
wherein the robot body comprises a robot arm and an end effector, the end effector being mounted on a tip of the robot arm to perform a given work, and
wherein the camera is mounted on one of the robot arm and the end effector at a given angle with respect to the end effector so that a tip of the end effector is included in the taken image.

4. The robot system according to claim 2,
wherein the robot body comprises a robot arm and an end effector, the end effector being mounted on a tip of the robot arm to perform a given work, and
wherein the camera is mounted on one of the robot arm and the end effector at a given angle with respect to the end effector so that a tip of the end effector is included in the taken image.

5. A robot system, comprising:
a robot body;
a stereo camera mounted on the robot body and configured to take an image of an object; and
a control device for driving the robot body based on a trajectory to an instruction point, which is set in advance, and, during this driving, driving the robot body so that the stereo camera moves linearly toward the object so as to be parallel to the epipolar plane, taking an image of the object with the stereo camera while the stereo camera is moving linearly, and measuring a three-dimensional position of the object from the taken image.

6. The robot system according to claim 5, wherein the control device drives the robot body so that the stereo camera moves linearly in parallel to an epipolar plane including a plane that comprises two focal points of the stereo camera and the instruction point set in advance.

7. The robot system according to claim 1, wherein the control device modifies the trajectory of the robot body based on the measured position of the object.

8. The robot system according to claim 5, wherein the control device modifies the trajectory of the robot body based on the measured three-dimensional position of the object.

9. A robot control method, comprising:
a linear movement control step of driving, by a control unit, a robot body based on a trajectory to an instruction point, which is set in advance, and, during this driving, driving the robot body so that the camera moves linearly toward the object so as to be parallel to the epipolar plane;
a object position measuring step of taking, by the control unit, an image of the object with the camera while the camera is moving linearly, and measuring a position of the object from the taken image.

10. The robot control method according to claim 9, wherein the linear movement control step further comprises driving and controlling the robot body so that the camera moves linearly in parallel to an optical axis of the camera.

11. A robot control method, comprising:
a linear movement control step of driving, by a control unit, a robot body based on a trajectory to an instruction point, which is set in advance, and, during this driving, driving the robot body so that the stereo camera moves linearly toward the object so as to be parallel to the epipolar plane; and
a three-dimensional position measuring step of taking, by the control unit, an image of the object with the stereo camera while the stereo camera is moving linearly, and measuring a three-dimensional position of the object from the taken image.

12. The robot control method according to claim 11, wherein the linear movement control step further comprises driving and controlling the robot body so that the stereo camera moves linearly in parallel to an epipolar plane including a plane that comprises two focal points of the stereo camera and the instruction point.

13. The robot control method according to claim 9, further comprising a trajectory modifying step of modifying, by the control unit, the trajectory of the robot body based on the measured position of the object.

14. The robot control method according to claim 12, further comprising a trajectory modifying step of modifying, by the control unit, the trajectory of the robot body based on the measured three-dimensional position of the object.

15. A non-transitory computer-readable recording medium having recorded thereon the robot control program for controlling a computer so that the computer executes the steps of a robot control method, the method comprising:
a linear movement control step of driving, by a control unit, a robot body based on a trajectory to an instruction point, which is set in advance, and, during this driving, driving the robot body so that the camera moves linearly toward the object so as to be parallel to the epipolar plane;
a object position measuring step of taking, by the control unit, an image of the object with the camera while the camera is moving linearly, and measuring a position of the object from the taken image.

16. A non-transitory computer-readable recording medium having recorded thereon the robot control program for controlling a computer so that the computer executes the steps of a robot control method, the method comprising:

a linear movement control step of driving, by a control unit, a robot body based on a trajectory to an instruction point, which is set in advance, and, during this driving, driving the robot body so that the stereo camera moves linearly toward the object so as to be parallel to the epipolar plane; and a three-dimensional position measuring step of taking, by the control unit, an image of the object with the stereo camera while the stereo camera is moving linearly, and measuring a three-dimensional position of the object from the taken image.

\* \* \* \* \*